(12) United States Patent
Li et al.

(10) Patent No.: US 7,539,253 B2
(45) Date of Patent: May 26, 2009

(54) INTERPOLATION IN CHANNEL STATE FEEDBACK

(75) Inventors: Qinghua Li, Sunnyvale, CA (US); Xintian E. Lin, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 1146 days.

(21) Appl. No.: 10/938,421

(22) Filed: Sep. 10, 2004

(65) Prior Publication Data

US 2006/0056531 A1 Mar. 16, 2006

(51) Int. Cl.
*H04K 1/10* (2006.01)
*H04L 27/18* (2006.01)

(52) U.S. Cl. .................. 375/260; 375/299; 375/347; 375/329; 455/562.1

(58) Field of Classification Search .............. 375/347, 375/267, 233, 355, 346, 260, 299, 329; 455/132, 455/137, 562.1; 370/204, 205, 319
See application file for complete search history.

(56) References Cited

U.S. PATENT DOCUMENTS

| | | | |
|---|---|---|---|
| 4,559,605 A | 12/1985 | Norsworthy | |
| 5,844,951 A | 12/1998 | Proakis et al. | |
| 5,999,826 A | 12/1999 | Whinnett | |
| 6,597,678 B1 | 7/2003 | Kuwahara et al. | |
| 6,847,805 B2 | 1/2005 | Liu | |
| 6,859,503 B2 * | 2/2005 | Pautler et al. | ............... 375/299 |
| 6,927,728 B2 | 8/2005 | Vook et al. | |
| 7,120,199 B2 | 10/2006 | Thielecke et al. | |
| 7,236,748 B2 | 6/2007 | Li et al. | |
| 7,362,822 B2 | 4/2008 | Li et al. | |
| 7,406,336 B2 * | 7/2008 | Astely et al. | ............. 455/562.1 |
| 2002/0150109 A1 | 10/2002 | Agee | |
| 2003/0085832 A1 | 5/2003 | Yu | |
| 2003/0086366 A1 | 5/2003 | Branlund et al. | |
| 2003/0087673 A1 | 5/2003 | Walton et al. | |
| 2003/0125040 A1 | 7/2003 | Walton et al. | |

(Continued)

FOREIGN PATENT DOCUMENTS

TW   0571525   1/2004

(Continued)

OTHER PUBLICATIONS

*International Search Report and Written Opinion of the International Searching Authority;* Dated Sep. 16, 2005; PCT/US2005/017774; 15 Pages.

(Continued)

*Primary Examiner*—Phuong Phu
(74) *Attorney, Agent, or Firm*—Dana B. Lemoine; Lemoine Patent Services, PLLC

(57) ABSTRACT

Feedback bandwidth may be reduced in a closed loop MIMO system by Householder transformations, vector quantization using codebooks, and down-sampling in the frequency domain. A column of a beamforming matrix is quantized using a codebook, a Householder reflection is performed on the beamforming matrix to reduce the dimensionality of the beamforming matrix, and the quantizing and performing of Householder reflection on the previously dimensionality reduced beamforming matrix is recursively repeated to obtain a further reduction of dimensionality of the beamforming matrix. These actions are performed for a subset of orthogonal frequency divisional multiplexing (OFDM) carriers, and quantized column vectors for the subset of OFDM carriers are transmitted.

12 Claims, 6 Drawing Sheets

U.S. PATENT DOCUMENTS

| | | | |
|---|---|---|---|
| 2003/0133469 | A1 | 7/2003 | Brockmann et al. |
| 2003/0210750 | A1 | 11/2003 | Onggosanusi et al. |
| 2004/0066761 | A1* | 4/2004 | Giannakis et al. ........... 370/329 |
| 2004/0178954 | A1* | 9/2004 | Vook et al. ................... 342/383 |
| 2004/0196871 | A1 | 10/2004 | Terry |
| 2004/0235433 | A1 | 11/2004 | Hugl et al. |
| 2004/0235529 | A1 | 11/2004 | Tarokh et al. |
| 2005/0101259 | A1 | 5/2005 | Tong et al. |
| 2005/0195905 | A1* | 9/2005 | Kowalski .................... 375/260 |
| 2005/0286663 | A1* | 12/2005 | Poon .......................... 375/347 |
| 2006/0056335 | A1 | 3/2006 | Lin et al. |
| 2006/0068718 | A1 | 3/2006 | Li et al. |
| 2006/0068738 | A1 | 3/2006 | Li et al. |
| 2006/0092054 | A1 | 5/2006 | Li et al. |
| 2006/0165191 | A1 | 7/2006 | Lin et al. |
| 2006/0182080 | A1 | 8/2006 | Yang et al. |
| 2007/0230431 | A1 | 10/2007 | Driesen et al. |

FOREIGN PATENT DOCUMENTS

| | | |
|---|---|---|
| WO | WO-2006031485 A1 | 3/2006 |
| WO | WO-2006078494 A2 | 7/2006 |

OTHER PUBLICATIONS

"PCT Search Report", PCT/US2005/031979, (Jan. 23, 2006), 12 pages.

"PCT Search Report", PCT/JS2005/031585, (Jan. 31, 2006), 22 pages.

Jihoon, C., et al., "Interpolation based transmit beamforming for MIMO-OFDM with Limited Feedback", *IEEE International Conference* on Paris, France, Piscataway, NJ, USA,. (Jun. 20, 2004),249-253.

June, C. R., et al., "Channel Feedback Quantization Method for MISO and MIMO Systems", *Personal Indoor and Mobile Radio Communications, 15th IEEEE International Symposium* on Barcelona, Spain, USA, *IEEE*, vol. 2, (Sep. 5-8, 2004), 805-809.

Onggosanusi, E. N., et al., "A Feedback-based Adaptive Multi-Input Multi-Output Signaling Scheme", *Conference Record of the 36th Asilomar conference on signals, systems, & computers*, Pacific Groove, CA, vol. 1 of 1, Conf. 36, (Nov. 3, 2002), 1694-1698.

"WLAN Access Control Technique", *Modern Electronic Technology*, 27(19), (2004), 78-81,83 pages.

"Taiwan Official Letter dated Nov. 8, 2007",3 pages.

"Translation of Taiwan Official Letter dated Nov. 8, 2007",2 pages.

Roh, et al., "Multiple Antenna Channels With Partial Channel State Information at the Transmitter", *IEEE*, vol. 3 (2), (Mar. 2004).

Zoltowski, Michael D., et al., "Simultaneous Sector Processing Via Root-Music for Large Sensor Arrays", *School of Electrical Engineering*, Purdue University., (1990), pp. 372-376.

Van Der Veen, Alle-Jan "Algebraic Methods For Deterministic Blind Beamforming", *Proceedings of the IEEE*, vol. 86, No. 10, Oct. 1998, 1987-2008.

* cited by examiner

INTERPOLATION IN CHANNEL STATE FEEDBACK

FIELD

The present invention relates generally to wireless networks, and more specifically to wireless networks that utilize multiple spatial channels.

BACKGROUND

Closed loop multiple-input-multiple-output (MIMO) systems typically transmit channel state information from a receiver to a transmitter. Transmitting the channel state information consumes bandwidth that might otherwise be available for data traffic.

DESCRIPTION OF EMBODIMENTS

Figure 1:
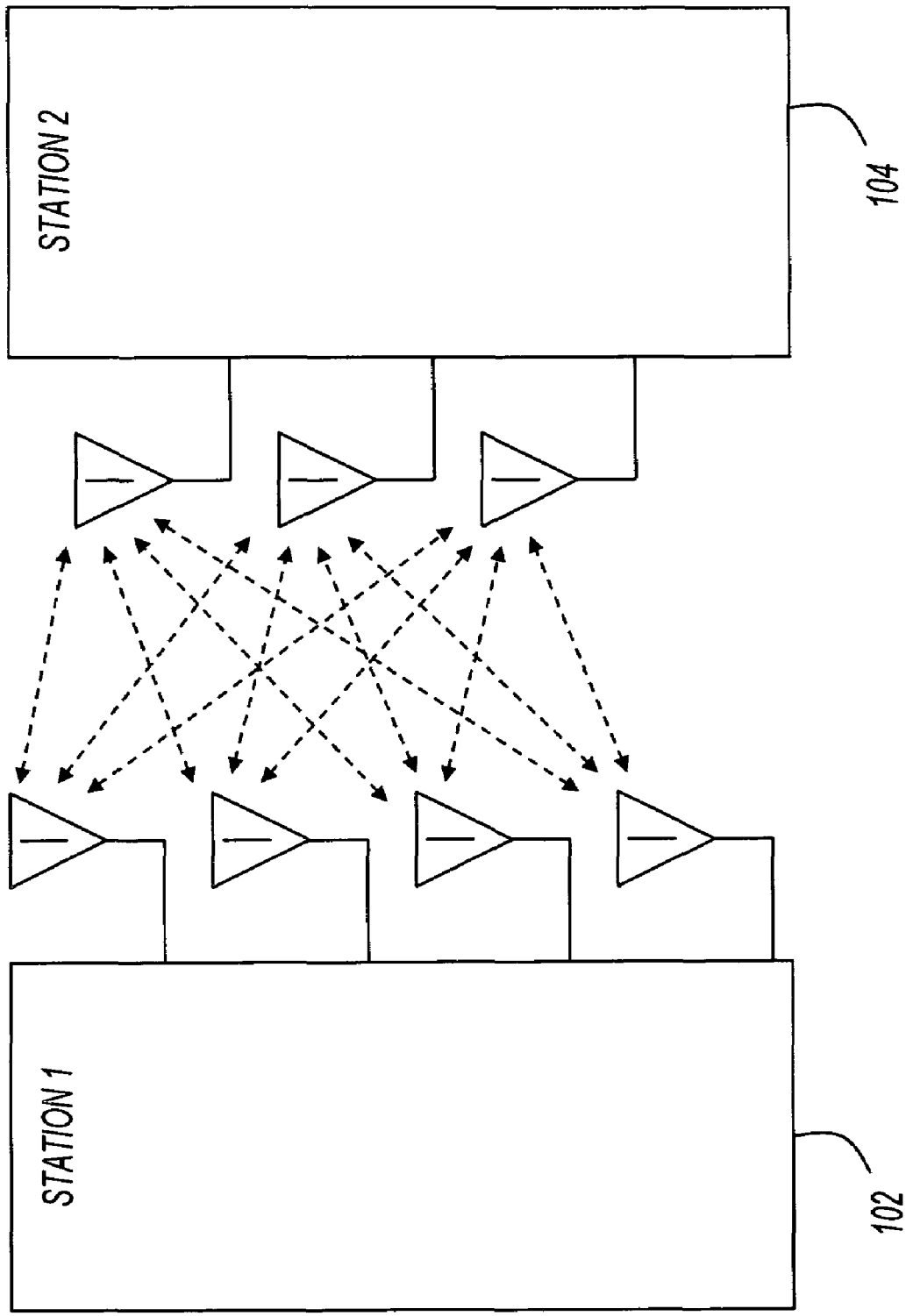
FIG. 1 shows a diagram of two wireless stations.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of two wireless stations: station 102, and station 104. In some embodiments, stations 102 and 104 are part of a wireless local area network (WLAN). For example, one or more of stations 102 and 104 may be an access point in a WLAN. Also for example, one or more of stations 102 and 104 may be a mobile station such as a laptop computer, personal digital assistant (PDA), or the like. Further, in some embodiments, stations 102 and 104 are part of a wireless wide area network (WWAN). For example, one or more of stations 102 and 104 may be a base station or a subscriber unit. Although only two stations are shown in FIG. 1, any number of stations may be present without departing from the scope of the present invention.

In some embodiments, stations 102 and 104 may operate partially in compliance with, or completely in compliance with, a wireless network standard. For example, stations 102 and 104 may operate partially in compliance with a standard such as ANSI/IEEE Std. 802.11, 1999 Edition, although this is not a limitation of the present invention. As used herein, the term "802.11" refers to any past, present, or future IEEE 802.11 standard, including, but not limited to, the 1999 edition. Also for example, stations 102 and 104 may operate partially in compliance with any other standard, such as any future IEEE personal area network standard or wide area network standard.

Stations 102 and 104 may include any number of antennas. In the example of FIG. 1, station 102 includes four antennas, and station 104 includes three antennas. The "channel" through which stations 102 and 104 communicate may include many possible signal paths. For example, when stations 102 and 104 are in an environment with many "reflectors" (e.g. walls, doors, or other obstructions), many signals may arrive from different paths. This condition is known as "multipath." In some embodiments, stations 102 and 104 utilize multiple antennas to take advantage of the multipath and to increase the communications bandwidth. For example, in some embodiments, stations 102 and 104 may communicate using Multiple-Input-Multiple-Output (MIMO) techniques. In general, MIMO systems offer higher capacities by utilizing multiple spatial channels made possible by multipath. The channel between stations 102 and 104 is described by the channel state matrix, H, that includes entries describing the complex channel gains between each transmit and receive antenna pair.

In some embodiments, stations 102 and 104 may communicate using orthogonal frequency division multiplexing (OFDM) in each spatial channel. Multipath may introduce frequency selective fading which may cause impairments like inter-symbol interference (ISI). OFDM is effective at combating frequency selective fading in part because OFDM breaks each spatial channel into small subchannels such that each subchannel exhibits a more flat channel characteristic. Scaling appropriate for each subchannel may be implemented to correct any attenuation caused by the subchannel. Further, the data carrying capacity of each subchannel may be controlled dynamically depending on the fading characteristics of the subchannel.

MIMO systems may operate either "open loop" or "closed loop." In open loop MIMO systems, a station doesn't explicitly transmit channel state information to another station for the second station to acquire channel state information. In closed loop systems, communications bandwidth is utilized to transmit current channel state information between stations, thereby reducing reducing overall throughput. The communications bandwidth used for this purpose is referred to herein as "feedback bandwidth." When feedback bandwidth is reduced in closed loop MIMO systems, more bandwidth is available for data communications.

Various embodiments of the present invention provide for closed loop MIMO with a compact feedback scheme, thereby saving feedback bandwidth. In some embodiments, feedback bandwidth is saved by feeding back transmit beamforming vectors instead of the channel matrix H. Further, in some embodiments, the elements of each beamforming vector are jointly quantized by vector quantization using codebooks. In some of these embodiments, different size codebooks are used different ones of the transmit beamforming vectors. For example, in some embodiments, three beamforming vectors are quantized using three small codebooks of sizes 16, 32 and 64 respectively. Further, in some embodiments, beamforming vectors are only fed back for the active spatial channels. This provides a significant overhead reduction in the case of spatial channel puncture, where the spatial channel corresponding to the weakest eigenmode is usually punctured.

Figure 2:
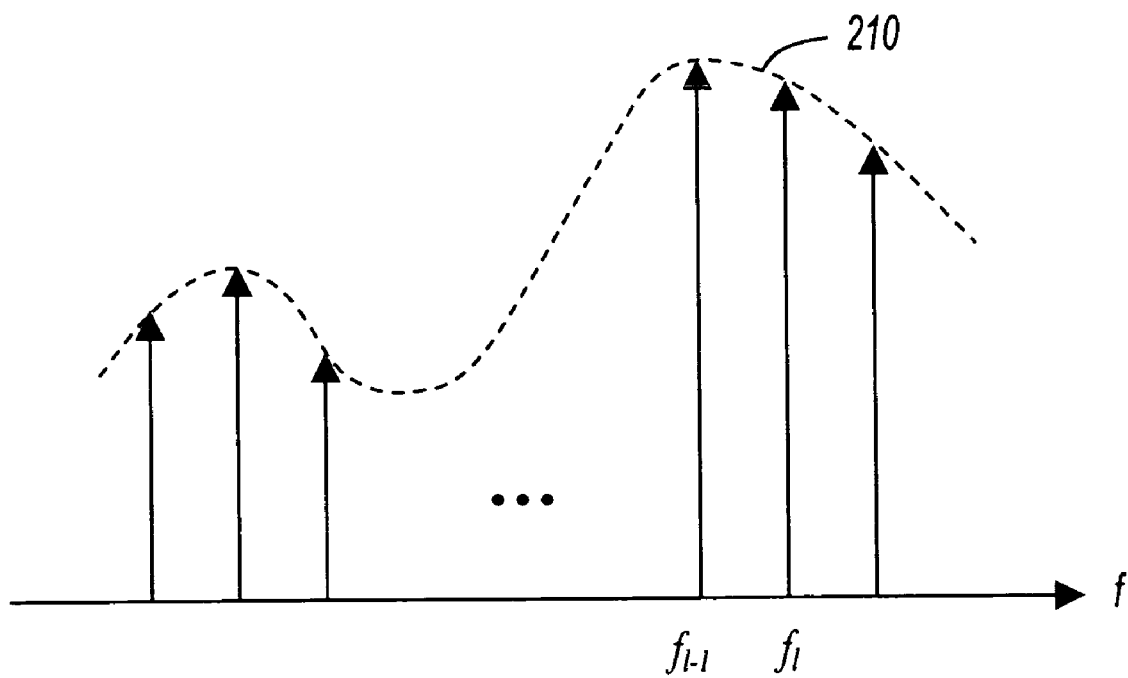
FIG. 2 shows frequency down-sampling in accordance with various embodiments of the present invention.

FIG. 2 shows frequency down-sampling in accordance with various embodiments of the present invention. The frequency response 210 is a hypothetical channel response as a function of frequency. The horizontal axis is labeled with carrier frequencies that correspond to subcarriers in an OFDM system. Various embodiments of the present invention may down-sample in the frequency domain and send back channel state information for less than all of the OFDM subcarriers. For example, because there is strong correlation between adjacent subcarriers, a station may determine beamforming vectors for a subset of all OFDM carriers and feed back quantized parameters for those vectors. In some embodiments, a fixed sampling rate is used, and in other embodiments, a variable sampling rate is used. In some embodiments, a station may only compute beamforming matrices for a few subcarriers and then feed back their quantization indexes without interpolation. In other embodiments, a station may interpolate the computed matrices and feed back the interpolated indexes to meet a constant feedback rate. In other embodiments, the station may transmit down-sampled channel information to a second station, and the second station may interpolate. Various interpolation embodiments are discussed in more detail below.

The various embodiments of the present invention provide a systematic, uniform scheme supporting all antenna configurations such as 2×2, 4×2, 4×4 and beyond, and one set of codebooks may be shared among the various antenna configurations. Further, the reconstructed matrix is unitary without additional correction.

A transmit beamforming matrix may be found using singular value decomposition (SVD) of the channel state matrix H as follows:

$$H_{m \times n} = U_{m \times m} D_{m \times n} V'_{n \times n} \quad (1)$$

$$x_{n \times 1} = V_{n \times n} d_{n \times 1} \quad (2)$$

where d is the n-vector of data symbols containing k non-zero elements, where k is the number of active spatial channels (see next paragraph); x is the beamformed, transmitted signal vector on n transmit antennas; H is the channel matrix; H's singular value decomposition is H=UDV'; U and V are unitary; D is a diagonal matrix with H's eigenvalues; V is n by n. Equation (2) is the beamforming step at the transmitter, which utilizes the beamforming matrix V fed back from the receiver to the transmitter.

Various embodiments of the present invention combine Householder reflection techniques with vector quantization in the quantization of V, the unitary beamforming matrix. First, a Householder reflection matrix, P, is constructed from $v_1$ the first column of V, where V is n by k; n is the number of transmit antennas; k is the number of spatial streams. The P matrix has the property that the first column of the product, PV, is $[e^{j\Phi_1} 0 \ldots 0]^T$. And the first row of PV becomes $[e^{j\Phi_1} 0 \ldots 0]$ due to orthogonality. Then, the quantization of an n by k V matrix is converted into the quantization of n-vector $v_1$ and the quantization of an n−1 by k−1 matrix $V_1$. This conversion reduces overhead and quantization complexity. The process is repeated to quantize $V_1$ and convert the problem to the quantization of (n−1)-vector $v_2$ and n−2 by k−2 matrix $V_2$. The step repeats k−1 times. Finally, the quantization of V is converted to the quantization of $v_1, v_2, \ldots, v_k$ that are k unit vectors of dimensions n, n−1, …, n−k+1.

In some embodiments, an access point may send training signals to a station and the station may compute and feedback the beamforming matrix V in (1). If the station knows beforehand that the access point only employs k spatial streams, or it wants that the access point only employs k spatial streams, the station may only feed back the first k columns of the V matrix, which corresponds to the k strongest eigenmodes of H. This offers an additional reduction in feedback bandwidth. The degree of freedom of H is $2n^2$ while the degree of freedom of V is $n^2-n$ for m=n. Since only V is useful for transmit beamforming and V contains less information than H, feeding back V is more efficient than feeding H.

Quantization of the beamforming matrix V is illustrated below by an example, in which 4 transmit antennas exist and 3 receive antennas exist. Although the example employs a 4×3 system, the various embodiments of the invention are not so limited. The receiver receives training symbols and computes the beamforming matrix, V as shown above in equation (1). Next, the receiver only needs to quantize the first 3 columns of V since the channel supports at most three modes. If the receiver knows the transmitter only employs two spatial channels, the receiver may only quantize the first two columns of V in the scheme depicted next.

In some embodiments, the V matrix is quantized column by column and recursively. After the quantization of one column, the size of the problem is reduced by one on both row and column dimensions. Denoting the beamforming matrix as:

$$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \quad (3)$$

the first column of V denoted as $v_1$ may be quantized as follows.

$$\hat{v}_1 = \arg\max_{u \in C_1} \|u^H v_1\| \quad (4)$$

where $C_1$ is a codebook containing unit 4-vectors for quantization shown at the bottom of this description. $\hat{v}_1$ has the maximum inner product among all unit vectors in the codebook. The codebook is constructed such that the codeword vectors distribute on the n-dimension complex unit sphere as uniformly as possible. Additionally, the first element of each codeword is set to be real for the next step.

A Householder reflection matrix is constructed as follows $$F_1 = I - \frac{2}{\|w_1\|^2} w_1 w_1^H, \quad (5)$$

In some embodiments, the Householder reflection matrix is determined as a function of the original column vector, in which case $$w_1 = v_1 - e_1 = \begin{bmatrix} v_{11} - 1 \\ v_{21} \\ v_{31} \\ v_{41} \end{bmatrix}.$$

In other embodiments, the Householder reflection matrix is determined as a function of the value of the vector selected from the codebook, in which case $$w_1 = \hat{v}_1 - e_1 = \begin{bmatrix} \hat{v}_{11} - 1 \\ \hat{v}_{21} \\ \hat{v}_{31} \\ \hat{v}_{41} \end{bmatrix}.$$

If $\hat{v}_1 = v_1$, Householder reflection converts the first column and row of V into $[e^{j\phi_1} 0\, 0\, 0]^T$ and $[e^{j\phi_1} 0\, 0\, 0]$ as shown in (6), where $\phi_1$ is the phase of $v_{11}$. Since usually $\hat{v}_1 \approx v_1$, there will be nonzero residuals in the off diagonal entries of the first column and row.

$$F_1 V = \begin{bmatrix} e^{j\phi_1} & 0.0 & 0.0 \\ 0.0 & \hat{v}_{11} & \hat{v}_{12} \\ 0.0 & \hat{v}_{21} & \hat{v}_{22} \\ 0.0 & \hat{v}_{31} & \hat{v}_{32} \end{bmatrix}, \quad (6)$$

where two properties are employed to get the result, i.e. $\hat{v}_{11}$ is real and the unitary property of V. Since both $F_1$ and V are unitary, $V_2$ is unitary. From (6), we see that the size of $V_2$ is 3×2 and it is reduced from that of $V_1$ by one on both row and column dimensions. Recursively, we repeat the actions in (4), (5), and (6) on $V_2$ as follows. First, we quantize the first column of $V_2$ denoted as $v_2$, using another codebook of unit 3-vectors shown at the bottom of this description, whose first element of each codeword is real. Then, we construct a Householder reflection matrix and multiply it with $V_2$ as follows.

$$F_2 V_2 = \begin{bmatrix} e^{j\phi_2} & 0.0 \\ 0.0 & \tilde{v}_{11} \\ 0.0 & \tilde{v}_{21} \end{bmatrix} \quad (7)$$

Finally, we quantize the vector $V_3$ using a codebook of unit 2-vectors shown at the bottom of this description. The quantization indexes of $v_1$, $v_2$, and $v_3$ are fed back to the access point, i.e. the transmitter, for beamforming. It is worth noting that the phases $\phi_i$ may not be sent back. If the feedback is conducted for every p subcarriers and the bandwidth of p contiguous subcarriers is comparable to the channel coherent bandwidth, feeding back $\phi_i$ may help the interpolation of beamforming matrix on subcarriers at the transmitter. In some embodiments, for high speed and low complexity, the codebooks are generated such that their sizes are no larger than 64. Since the codebook size is small, the Householder matrix for each codeword can be stored beforehand to reduce computational complexity.

In some embodiments, for high speed and low complexity, the division operation in the construction of Householder matrices such as the division of $\|w_1\|^2$ in Equation (5) may be converted into a multiplication of $\|w_1\|^2$. For example, multiplying both sides of Equation (5) removes the division as follows.

$$\tilde{F}_1 = \|w_1\|^2 F_1 = \|w_1\|^2 I - 2 w_1 w_1^H \quad (8)$$

$$\tilde{F}_1 V = \begin{bmatrix} \|w_1\|^2 e^{j\phi_1} & 0.0 & 0.0 \\ 0.0 & \hat{v}_{11} & \hat{v}_{12} \\ 0.0 & \hat{v}_{21} & \hat{v}_{22} \\ 0.0 & \hat{v}_{31} & \hat{v}_{32} \end{bmatrix} \quad (9)$$

Since $V_2$ is a scaled unitary matrix whose scaling factor is $\|w_1\|^2$, the construction of the second Householder matrix is accordingly changed as follows.

$$w_2 = \hat{v}_1 - \|w_1\|^2 e_1 = \begin{bmatrix} \hat{v}_{11} - \|w_1\|^2 \\ \hat{v}_{21} \\ \hat{v}_{31} \end{bmatrix} \quad (10)$$

$$\tilde{F}_2 = \|w_2\|^2 I - 2 w_2 w_2^H \quad (11)$$

Pseudo code representing various embodiments of quantization algorithms for a general beamforming matrix is listed as follows.

Quantization Algorithm of V

1. Compute singular value decomposition of the downlink channel matrix H with size m by n as in equation (1), and obtain the first k columns of the beamforming matrix V, where k is the number of active spatial channels.

2. Let $\tilde{V} = V_{:,1:k}$, which is a temporary matrix and is formed by the first k columns of V.

3. For i=1: min(k,n−1)

3.1. Let $v_i = \tilde{V}_{:,1}$, which is the first column of $\tilde{V}$.
    3.2. Quantize $v_i$ by finding $\hat{v}_i = \arg\max_{u \in C_i} \|u^H v_i\|$, where $C_i$ is a codebook of unit n−i+1 vectors.
    3.3. Record the index of $\hat{v}_i$ in the codebook for feedback.
    3.4. If the reconstruction at the transmitter requires the global phase of $v_i$ for interpolation, then compute the global phase of $v_i$ with respect to $\hat{v}_i$ as follows. $\phi_i$=phase($\hat{v}'_i$, $v_i$). Quantize $\phi_i$ and feed back the index.
    3.5. Construct a Householder reflection matrix as $$F_i = I - \frac{2}{\|w_i\|^2} w_i w_i^H,$$

where $w_i = \hat{v}_i - e_1$ and $e_1$ is the unit vector with all zero elements except the first equal to one.

3.6. Conduct Householder reflection on $\tilde{V}$ as $\bar{V} = F_i \tilde{V}$. To reduce complexity, one only needs to compute columns and rows of $\bar{V}$ other than the first one.

3.7. Update $\tilde{V} = \bar{V}_{2:n-i+1, 2:k}$.

4. End

In some embodiments, the optional quantization of $\phi_i$ may be merged with the quantization of $v_i$ by using a jointly designed codebook. In these embodiments, the phase $\phi_i$ of the first element of $\hat{v}_i$ may be factored out before the computation of the Householder reflection vector $w_i$.

At the transmitter side, the reconstruction of the beamforming matrix V is as follows. It starts from the lowest dimension and recursively constructs the whole matrix. In each step, a Householder matrix is computed from a reconstructed unit vector. The Householder matrix can be computed and stored beforehand for small codebooks. Even in the case that there is no quantization error, the reconstructed matrix could be different from the original V by a global phase on each column. The lack of global phase information at the transmitter is discussed further below in the second entitled "Down-sampling and Interpolation." First, two vectors, $v_3$ and $v_2$, are reconstructed using the feedback quantization indexes and the corresponding 2-vector and 3-vector codebooks. Second, a Householder matrix is computed using the reconstructed $\hat{v}_2$ as $$F_2 = I - \frac{2}{\|w\|^2} w w^H, \quad (12)$$

where $w=\hat{v}_2-e_1$ and $\hat{v}_2$ is the reconstructed 3-vector; $F_2$ can be stored beforehand to reduce computation. Third, $V_2$ can be reconstructed as $$\hat{V}_2 = F_2 \begin{bmatrix} 1 & 0 \\ 0 & \hat{v}_3 \\ 0 & \end{bmatrix} \quad (13)$$

Fourth, we reconstruct the first column of V using the quantization index and compute a Householder matrix as $$F_1 = I - \frac{2}{\|w\|^2} w w^H, \quad (14)$$

where $w=\hat{v}_1-e_1$ and $\hat{v}_1$ is the reconstructed first column of V. Finally, the beamforming matrix V is given by $$\hat{V} = F_1 \begin{bmatrix} 1 & 0 & 0 \\ 0 & & \\ 0 & & \hat{V}_2 \\ 0 & & \end{bmatrix}. \quad (15)$$

If the global phases $\phi_i$ for i=1,2, and 3 are quantized and fed back for interpolation, the global phases can be added to the $\hat{V}$ reconstructed in (15) as $$\hat{V} = \hat{V} \begin{bmatrix} e^{j\hat{\phi}_1} & 0 & 0 \\ 0 & e^{j\hat{\phi}_2} & 0 \\ 0 & 0 & e^{j\hat{\phi}_3} \end{bmatrix} \quad (16)$$

where $\hat{\phi}_i$ is the quantized $\phi_i$.

Since the codebook size is less than 64, which is small, the Householder matrix for each codebook entry can be stored beforehand to speedup the reconstruction.

In general, the receiver of the beam forming vector index can reconstruct the beam forming vector according to the following algorithm.

Reconstruction Algorithm of V

1. Receive indices $n_i$, i=1, ..., N where N is the number of feedback indices.
2. If k<n, where k and n are the numbers of spatial streams and transmit antennas respectively, do
   2.1 Let $\hat{V}=\hat{v}_N$, the $n_N$-th vector of the codebook of (n−k+1) dimension unit vector.
   2.2 J=N−1.
3. Else
   3.1 Let $\hat{V}=1$.
   3.2 J=N.
4 End
5. For i=J:−1:1
   5.1 $\hat{v}_i$=the $n_i$-th vector of the codebook of (n−1+1) dimension unit vector 5.2 $F_i = I - \frac{2}{\|w\|^2} w w^H$, $w = \hat{v}_i - e_1$.

5.3 $\hat{V} = F_i \begin{bmatrix} 1 & 0 \\ 0 & \hat{V} \end{bmatrix}$.

6. End
7. If the global phases $\phi_i$ for i=1, ..., k are quantized and fed back for interpolation, the global phases can be added to the $\hat{V}$ as $$\hat{V} = \hat{V} \begin{bmatrix} e^{j\hat{\phi}_1} & & \\ & \ddots & \\ & & e^{j\hat{\phi}_k} \end{bmatrix}$$

In some embodiments, the optional reconstruction of $\phi_i$ can be merged with the reconstruction of $v_i$ by using a jointly designed codebook. In that case, the phase $\hat{\phi}_i$ of the first element of $\hat{v}_i$ needs to be factored out before the computation of the vector w.

Down Sampling and Interpolation of Beamforming Matrix

Since the beamforming matrixes for adjacent subcarriers are highly correlated, some embodiments of the present invention feed back channel state information for less than all of the OFDM subcarriers, as described above with reference to FIG. 2. For example, some embodiments down-sample in the frequency domain, and feed back channel state information for every $n_{ds}$ subcarriers, and interpolation is utilized to obtain the skipped beamforming matrixes. Three example embodiments of interpolation schemes are as follows.

Interpolation Scheme 1.

1) Reconstruct beamforming matrices for feedback subcarriers using operations described above with reference to equations (12)-(16) and the paragraph labeled "Reconstruction Algorithm of V."

2) For each entry of the beamforming matrix, conduct interpolation across subcarriers. The interpolation methods can be such as linear and spline, and the method can also be Wiener-Kolmogorov filtering if the second order statistics of channel variation across frequency is known.

3) Orthogonalize the interpolated matrixes because they are not necessarily unitary.

Example embodiment scheme 1 may be employed in cases where the global phases $\phi_i$ are fed back. In embodiments in which the global phases are not fed back, the next two schemes may be employed.

Figure 3:
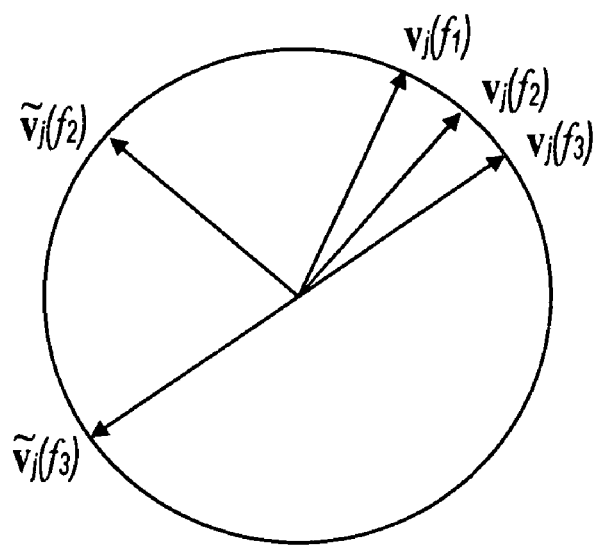
FIG. 3 shows beamforming vectors reconstructed using interpolation.

FIG. 3 shows beamforming vectors reconstructed using interpolation. $v_j(f_1)$ and $v_j(f_3)$ are beamforming vectors reconstructed from quantization indexes for subcarrier 1 and 3. $v_j(f_2)$ is the interpolated beamforming vector for subcarrier 2. However, there is a 180 degree phase ambiguity in the phase of $v_j(f_1)$ or $v_j(f_3)$, if the global phases $\phi_i$ are not fed back. For example, instead of $v_j(f_3)$, the reconstructed beamforming vector of subcarrier 3 can also be $\tilde{v}_j(f_3)$, which has a 180 degree phase difference from that of $v_j(f_3)$. Although the phase ambiguity doesn't cause a problem for the beamforming of subcarrier 1 and 3, it may cause a problem for the interpolated beamforming vector for subcarrier 2. As shown in FIG. 3, $v_j(f_2)$ and $\tilde{v}_j(f_2)$ differ by 90 degrees and only one of them correctly works.

Interpolation Scheme 2.
1) Reconstruct beamforming matrices for feedback subcarriers using operations described above with reference to equations (12)-(16) and the paragraph Reconstruction Algorithm of V.
2) Sequentially adjust the global phase of each column of the beamforming matrix as follows.

$$\hat{v}_j(f_l) = \hat{v}_j(f_l) \frac{\hat{v}'_j(f_l)\hat{v}_j(f_{l-1})}{\|\hat{v}'_j(f_l)\hat{v}_j(f_{l-1})\|}, \quad (17)$$

where $\hat{v}_1(f_i)$ is the beamforming vector for the j-th transmit antenna (or the j-th column of the reconstructed beamforming matrix) for the l-th feedback subcarrier. Equation (17) essentially removes the global phase difference between two beamforming vectors for two adjacent feedback subcarriers and smoothes the entry phase variation across subcarriers.

3) For each entry of the beamforming matrices, conduct interpolation across subcarriers. The interpolation methods can be such as linear and spline, and the method can also be Wiener-Kolmogorov filtering if the second order statistics of channel variation across frequency is known.
4) Orthogonalize the interpolated matrixes because they are not necessarily unitary.

Since 4) may employ a high complexity algorithm such as QR decomposition and Gram-Schmidt orthogonalization, various embodiments described next do not utilize an orthogonalization step, and interpolate the feedback unit vectors instead of the full beamforming matrix.

Interpolation Scheme 3:
1) Reconstruct unit vectors, $v_1$, $v_2$, and $V_3$ in the example and $v_i$ in the paragraph Quantization Algorithm of V, using the feedback indexes and the corresponding codebooks for each feedback subcarrier.
2) For each reconstructed unit vector except the first, sequentially adjust the global phase of each vector of the beamforming matrix as follows.

$$\hat{v}_i(f_l) = \hat{v}_i(f_l) \frac{\hat{v}'_i(f_l)\hat{v}_i(f_{l-1})}{\|\hat{v}'_i(f_l)\hat{v}_i(f_{l-1})\|} \quad (18)$$

where $\hat{v}_i(f_1)$ is the unit vector for the i-th column of the beamforming matrix V and the l-th feedback subcarrier. Equation (18) essentially removes the global phase difference between two unit vectors for two adjacent subcarriers and smoothes the entry phase variation across subcarriers.

3) Since the unit vectors $\hat{v}_i(f_l)$ for each i are on a unit sphere, vector interpolation can be employed. For example, the vectors between $\hat{v}_i(f_{l-1})$ and $\hat{v}_i(f_l)$ can be interpolated along the geodesic connecting $\hat{v}_i(f_{l-1})$ and $\hat{v}_i(f_l)$ on the sphere. The interpolation to obtain the middle unit vector $v_m$ between two given unit vectors $v_1$ and $v_2$ can be efficiently computed as $$v_m = \frac{v_1 + v_2}{\|v_1 + v_2\|}.$$

This simple interpolation can be recursively applied between $v_1$ and $v_m$ (and then between $v_m$ and $v_2$) in order to obtain interpolations for different downsample rates.

Besides vector interpolation, scalar interpolation similar to that in Scheme 2 can be employed alternatively as follows. For each entry of the reconstructed unit vectors, conduct interpolation across subcarriers, and normalize the norm of each interpolated vector to unity. The interpolation methods can be such as linear and spline, and the method can also be Wiener-Kolmogorov filtering if the second order statistics of channel variation across frequency is known.

4) Reconstruct beamforming matrixes for each subcarrier using the interpolated vectors and the operations described above with reference to equations (12)-(16) and the paragraph labeled "Reconstruction Algorithm of V."

If the global phases $\phi_i$ are also feedback, the phase smoothing step, i.e. the second in Scheme 2 and 3 is optional.

Figure 4:
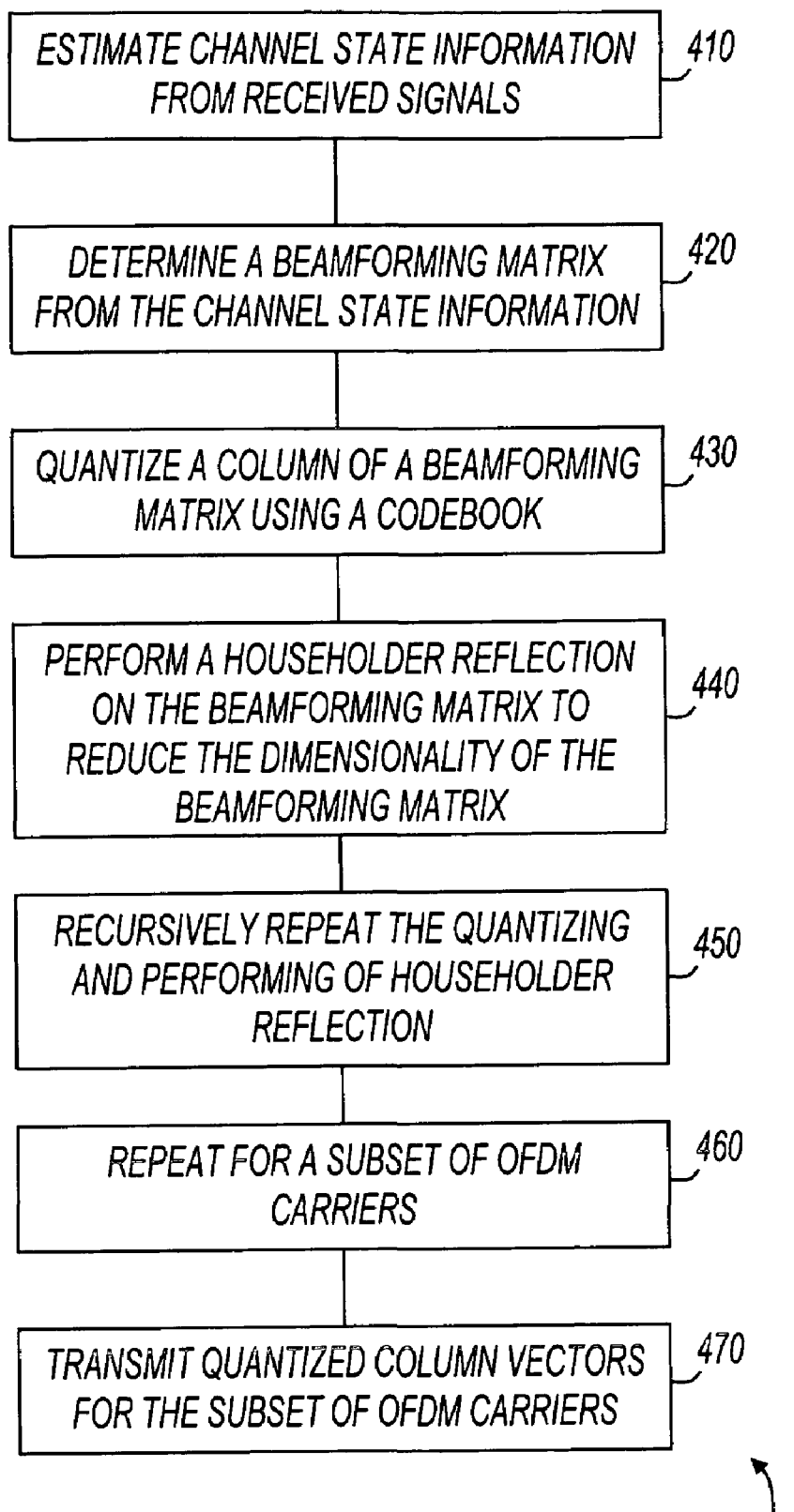
FIGS. 4, 5, and 6 show flowcharts in accordance with various embodiments of the present invention.

FIG. 4 shows a flowchart in accordance with various embodiments of the present invention. In some embodiments, method 400 may be used in, or for, a wireless system that utilizes MIMO technology. In some embodiments, method 400, or portions thereof, is performed by a wireless communications device, embodiments of which are shown in the various figures. In other embodiments, method 400 is performed by a processor or electronic system. Method 400 is not limited by the particular type of apparatus or software element performing the method. The various actions in method 400 may be performed in the order presented, or may be performed in a different order. Further, in some embodiments, some actions listed in FIG. 4 are omitted from method 400.

Method 400 is shown beginning at block 410 in which channel state information is estimated from received signals. The channel state information may include the channel state matrix H described above. At 420, a beamforming matrix is determined from the channel state information. In some embodiments, this corresponds to performing singular value decomposition (SVD) as described above with reference to equation (1). The beamforming matrix V is also described above.

At 430, a column of a beamforming matrix is quantized using a codebook. In various embodiments of the present invention, the actions of 430 correspond to searching a code block for an entry that most closely matches the column vector. For example, the operations described above with reference to equation (4) may be utilized to search a code book. In various embodiments of the present invention, the size of the codebook, and therefore the number of bits used to represent the quantized vector, may vary. For example, in some embodiments, a large codebook may be used for all column vectors. Also for example, in some embodiments longer column vectors may be quantized using larger codebooks, and a smaller column vectors may be quantized using a smaller code book.

At 440, a Householder reflection is performed on the beamforming matrix to reduce the dimensionality of the beamforming matrix. In some embodiments, the actions of 440 correspond to the operations described above with reference to the equations (5) and (6). At 450, the quantizing and Householder reflection operations of 430 and 440 are recursively repeated. As the operations are recursively repeated, each of the column vectors may be quantized using the same codebook or different codebooks. For example, as the dimensionality of the beamforming matrix is reduced, smaller codebooks may be used for successive column vectors. In some embodiments, where three column vectors are quantized, codebooks of descending size may be utilized such that the column vectors are quantized into eight bits, six bits, three bits, or six bits, five bits, and four bits, or five bits, four bits, and three bits, although this is not a limitation of the present invention.

At 460, the actions of 410-450 are repeated for a subset of all OFDM carriers to produce quantized column vectors representing less than all OFDM carriers. In some embodiments, method 400 interpolates between the subset of carriers to provide channel state information for more subcarriers. At 470, the quantized column vectors for the subset of OFDM subcarriers are transmitted.

Figure 5:
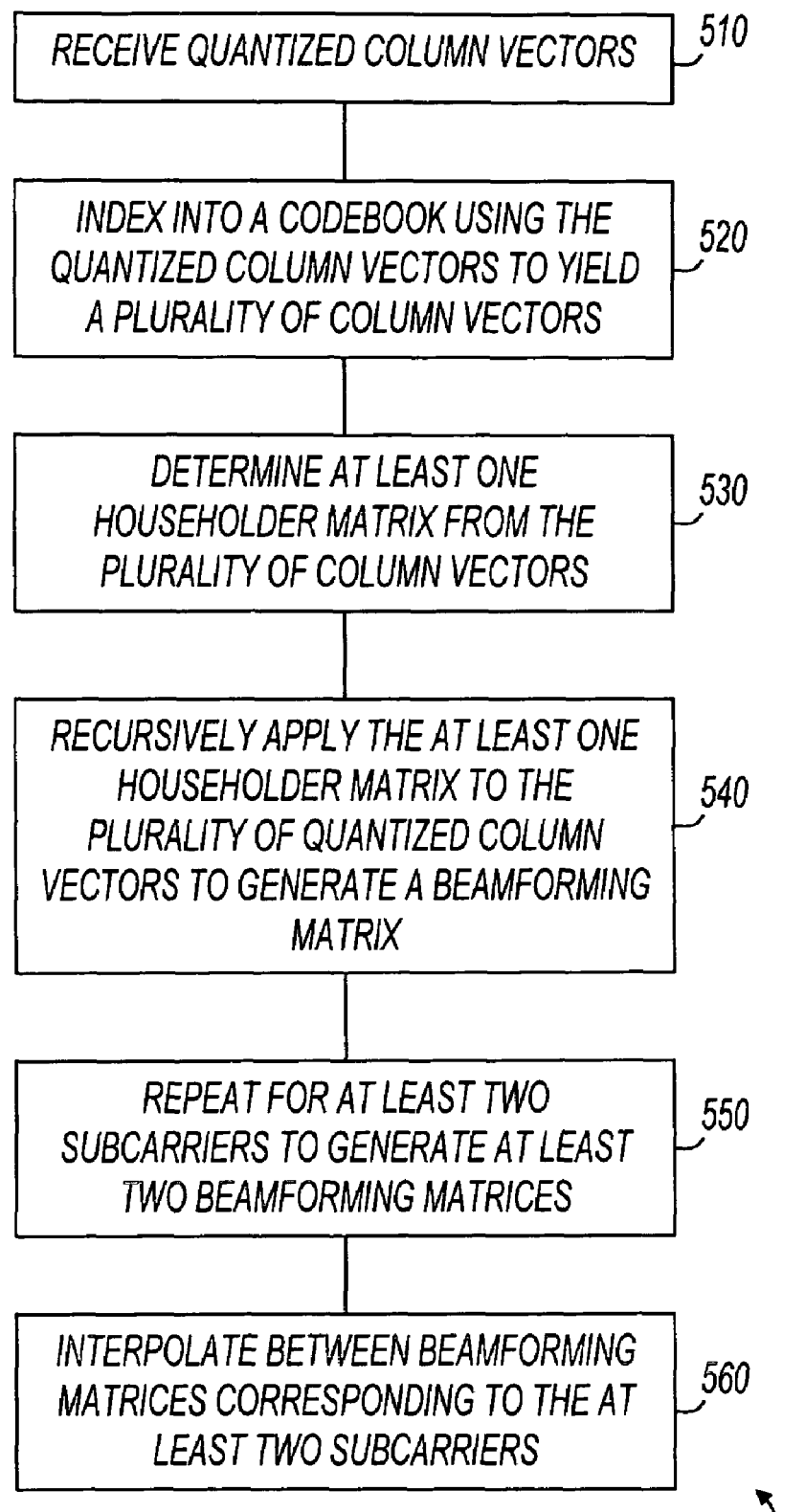

FIG. 5 shows a flowchart in accordance with various embodiments of the present invention. In some embodiments, method 500 may be used in, or for, a wireless system that utilizes MIMO technology. In some embodiments, method 500, or portions thereof, is performed by a wireless communications device, embodiments of which are shown in the various figures. In other embodiments, method 500 is performed by a processor or electronic system. Method 500 is not limited by the particular type of apparatus or software element performing the method. The various actions in method 500 may be performed in the order presented, or may be performed in a different order. Further, in some embodiments, some actions listed in FIG. 5 are omitted from method 500.

Method 500 is shown beginning at block 510 in which quantized column vectors are received. At 520, one or more codebooks are indexed into using the quantized column vectors to yield a plurality of column vectors. The actions of 520 may take many different forms. For example, quantized column vectors make each the represented by a different number of bits, and each may correspond to a different codebooks of column vectors. Further, one or more column vectors may be represented as quantized sub-vectors, and each quantized sub-vector may be used to index into one or more codebooks, and a single column vector may be regenerated from multiple codebook entries.

At 530, at least one Householder matrix is determined from the plurality of column vectors. In some embodiments, this may correspond to performing operations such as those described above with reference to equations (9) and (11). In other embodiments, a table may be maintained with a one-to-one correspondence between quantized column vectors and Householder matrices. In these embodiments, a Householder matrix may be determined by indexing into a table using quantized column vector values.

At 540, thee at least one Householder matrix is recursively applied to the plurality of quantized column vectors to generate a beamforming matrix. In some embodiments, the operations of 540 may correspond to the actions described above with respect to equations (7) and (9). At 550, the actions of 520-540 are repeated for at least two subcarriers to generate at least two beamforming matrices, and at 560, method 500 interpolates between beamforming matrices corresponding to the at least two subcarriers.

In some embodiments, the operations of method 500 may correspond to the operations represented by the pseudo-code appearing above after equation (11). After the beamforming matrix is reproduced, the apparatus performing method 500 may utilize the beamforming matrix to operate on transmitted signals in a MIMO system.

Figure 6:
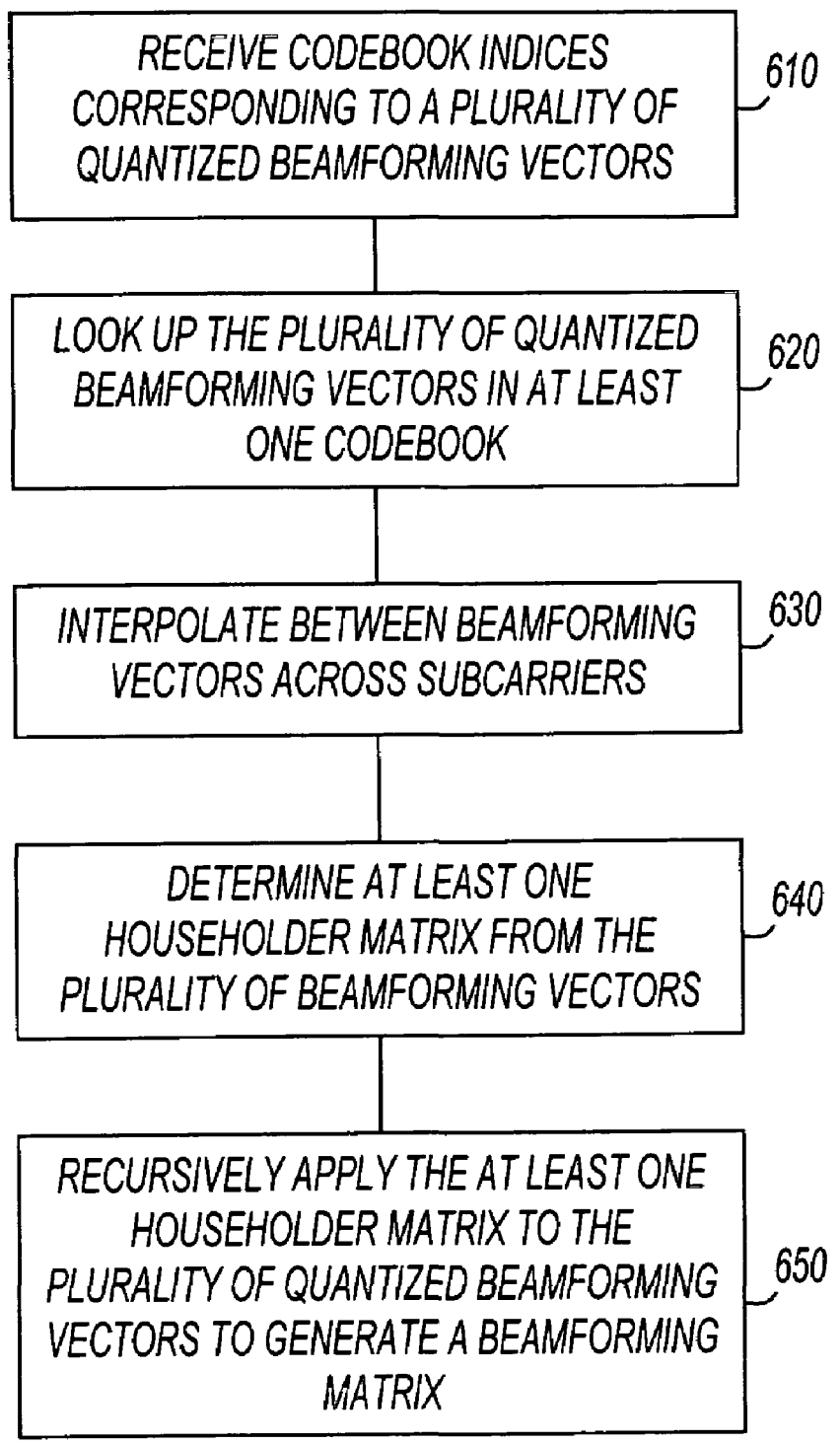

FIG. 6 shows a flowchart in accordance with various embodiments of the present invention. In some embodiments, method 600 may be used in, or for, a wireless system that utilizes MIMO technology. In some embodiments, method 600, or portions thereof, is performed by a wireless communications device, embodiments of which are shown in the various figures. In other embodiments, method 600 is performed by a processor or electronic system. Method 600 is not limited by the particular type of apparatus or software element performing the method. The various actions in method 600 may be performed in the order presented, or may be performed in a different order. Further, in some embodiments, some actions listed in FIG. 6 are omitted from method 600.

Method 600 is shown beginning at block 610 in which codebook indices corresponding to a plurality of quantized beamforming vectors are received. At 620, the plurality of quantized column beamforming vectors are looked up in at least one codebook. At 630, method 600 interpolates between beamforming vectors across subcarriers, and at 640, at least one Householder matrix is determined from the plurality of beamforming vectors. At 650, method 600 recursively applies the at least one Householder matrix to the plurality of quantized beamforming vectors to generate a beamforming matrix.

Figure 7:
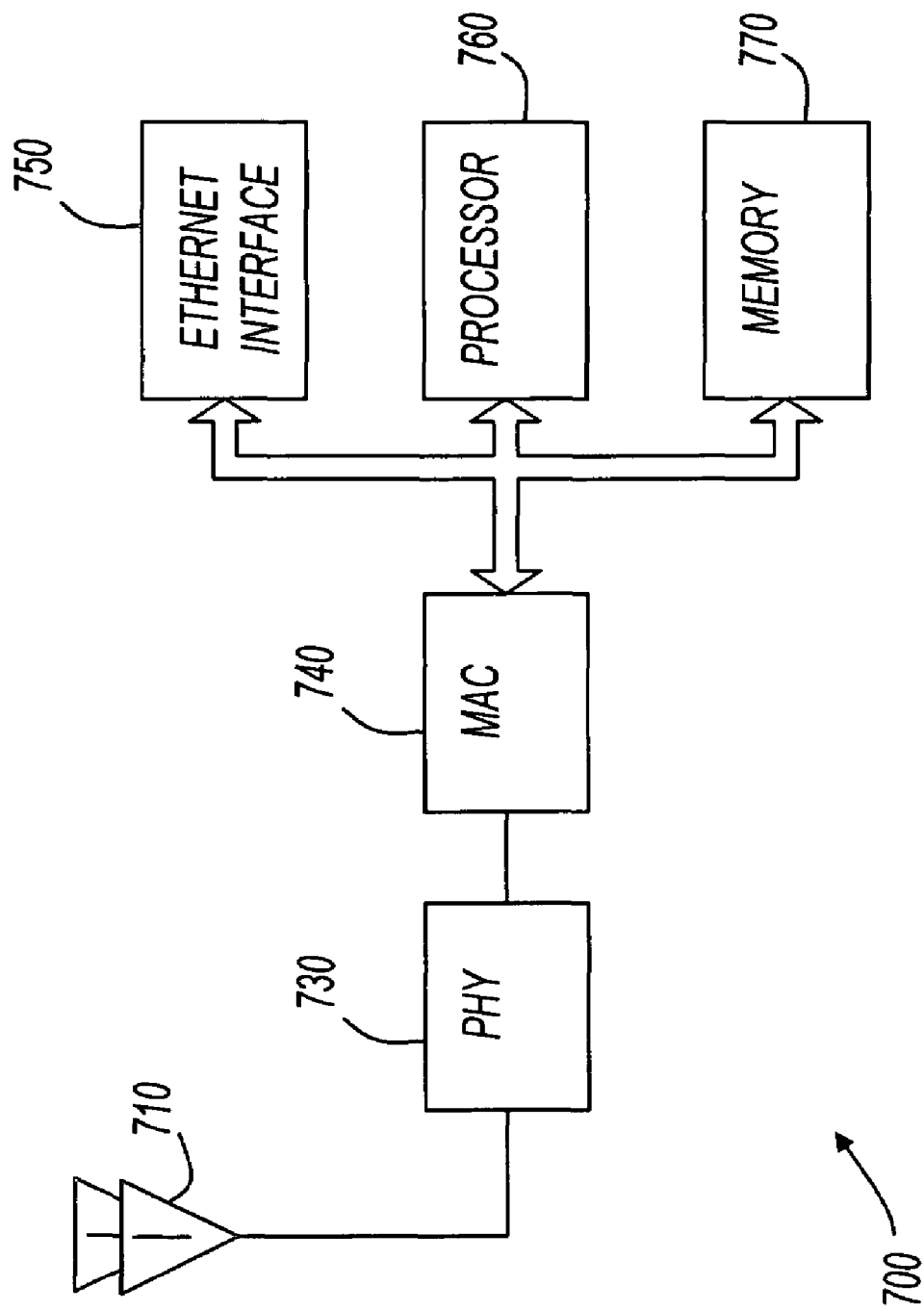
FIG. 7 shows an electronic system in accordance with various embodiments of the present invention.

FIG. 7 shows a system diagram in accordance with various embodiments of the present invention. Electronic system 700 includes antennas 710, physical layer (PHY) 730, media access control (MAC) layer 740, Ethernet interface 750, processor 760, and memory 770. In some embodiments, electronic system 700 may be a station capable of quantizing column vectors and performing Householder transformations as described above with reference to the previous figures. In other embodiments, electronic system 700 may be a station that receives quantized column vectors, and performs beamforming in a MIMO system. For example, electronic system 700 may be utilized in a wireless network as station 102 or station 104 (FIG. 1). Also for example, electronic system 700 may be a station capable of performing the calculations shown in any of the equations above.

In some embodiments, electronic system 700 may represent a system that includes an access point, a mobile station, a base station, or a subscriber unit as well as other circuits. For example, in some embodiments, electronic system 700 may be a computer, such as a personal computer, a workstation, or the like, that includes an access point or mobile station as a peripheral or as an integrated unit. Further, electronic system 700 may include a series of access points that are coupled together in a network.

In operation, system 700 sends and receives signals using antennas 710, and the signals are processed by the various elements shown in FIG. 7. Antennas 710 may be an antenna array or any type of antenna structure that supports MIMO processing. System 700 may operate in partial compliance with, or in complete compliance with, a wireless network standard such as an 802.11 standard.

Physical layer (PHY) 730 is coupled to antennas 710 to interact with a wireless network. PHY 730 may include circuitry to support the transmission and reception of radio frequency (RF) signals. For example, in some embodiments, PHY 730 includes an RF receiver to receive signals and perform "front end" processing such as low noise amplification (LNA), filtering, frequency conversion or the like. Further, in some embodiments, PHY 730 includes transform mechanisms and beamforming circuitry to support MIMO signal processing. Also for example, in some embodiments, PHY 730 includes circuits to support frequency up-conversion, and an RF transmitter.

Media access control (MAC) layer 740 may be any suitable media access control layer implementation. For example, MAC 740 may be implemented in software, or hardware or any combination thereof. In some embodiments, a portion of MAC 740 may be implemented in hardware, and a portion may be implemented in software that is executed by processor 760. Further, MAC 740 may include a processor separate from processor 760.

In operation, processor 760 reads instructions and data from memory 770 and performs actions in response thereto. For example, processor 760 may access instructions from memory 670 and perform method embodiments of the present invention, such as method 400 (FIG. 4), method 500 (FIG. 5), method 600 (FIG. 6) or methods described with reference to other figures. Processor 760 represents any type of processor, including but not limited to, a microprocessor, a digital signal processor, a microcontroller, or the like.

Memory 770 represents an article that includes a machine readable medium. For example, memory 770 represents a random access memory (RAM), dynamic random access memory (DRAM), static random access memory (SRAM), read only memory (ROM), flash memory, or any other type of article that includes a medium readable by processor 760. Memory 770 may store instructions for performing the execution of the various method embodiments of the present invention. Memory 770 may also store beamforming matrices or beamforming vectors.

Although the various elements of system 700 are shown separate in FIG. 7, embodiments exist that combine the circuitry of processor 760, memory 770, Ethernet interface 750, and MAC 740 in a single integrated circuit. For example, memory 770 may be an internal memory within processor 760 or may be a microprogram control store within processor 760. In some embodiments, the various elements of system 700 may be separately packaged and mounted on a common circuit board. In other embodiments, the various elements are separate integrated circuit dice packaged together, such as in a multi-chip module, and in still further embodiments, various elements are on the same integrated circuit die.

Ethernet interface 750 may provide communications between electronic system 700 and other systems. For example, in some embodiments, electronic system 700 may be an access point that utilizes Ethernet interface 750 to communicate with a wired network or to communicate with other access points. Some embodiments of the present invention do not include Ethernet interface 750. For example, in some embodiments, electronic system 700 may be a network interface card (NIC) that communicates with a computer or network using a bus or other type of port.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

Codebooks

The following codebooks are chosen to minimize the mean quantization errors. These codebooks are equivalent to any of their unitary transformed versions. In choosing the normalization, the following choices were made: The first entry is a unit vector in $\hat{e}_1$ direction and the first element of all codebook entries is real. This choice reduces the number of memory elements needed to store the codebook. Each n-vector m-entry codebook uses $2*m*n-m-2n$ real memory space.

| 1. Codebook for unit 2-vector with 4 entries | | | |
|---|---|---|---|
| 1.0000 | 0.5774 | 0.5774 | 0.5774 |
| 0 | −0.0613 + 0.8142i | −0.6745 − 0.4602i | 0.7358 − 0.3540i |
| 2. Codebook for unit 2-vector with 8 entries | | | |
| 1.0000 | 0.7941 | 0.7941 | 0.7940 |
| 0 | 0.0189 − 0.6074i | 0.4813 + 0.3711i | −0.2635 + 0.5478i |
| 0.7940 | 0.5112 | 0.3289 | 0.3289 |
| −0.5905 − 0.1442i | 0.7771 − 0.3672i | 0.2178 + 0.9189i | −0.5716 − 0.7517i |
| 3. Codebook for unit 2-vector with 16 entries | | | |
| 1.0000 | 0.8997 | 0.8997 | 0.8970 |
| 0 | 0.0150 − 0.4362i | 0.3612 + 0.2452i | −0.4388 − 0.0533i |
| 0.8969 | 0.8463 | 0.7259 | 0.7250 |
| −0.2129 + 0.3875i | 0.4748 − 0.2417i | −0.4396 − 0.5290i | 0.1703 + 0.6674i |
| 0.6409 | 0.6409 | 0.6102 | 0.6099 |
| 0.3045 − 0.7046i | 0.7491 + 0.1679i | −0.7922 − 0.0056i | −0.4612 + 0.6444i |
| 0.3730 | 0.3722 | 0.3236 | 0.2278 |
| −0.3442 − 0.8616i | 0.4959 + 0.7845i | 0.8426 − 0.4304i | −0.8683 + 0.4406i |
| 4. Codebook for unit 3-vector with 8 entries | | | |
| 1.0000 | 0.5000 | 0.5000 | 0.5000 |
| 0 | 0.6314 − 0.0885i | −0.6315 + 0.0975i | 0.4855 + 0.1593i |
| 0 | 0.3104 + 0.4971i | −0.3186 − 0.4901i | −0.6806 − 0.1603i |
| 0.5000 | 0.5000 | 0.5000 | 0.4954 |

-continued

| | | | |
|---|---|---|---|
| −0.4891 − 0.1541i | 0.3426 − 0.0921i | −0.3436 + 0.0938i | −0.0143 − 0.8442i |
| 0.6815 + 0.1501i | 0.3837 − 0.6906i | −0.3737 + 0.6953i | −0.2042 − 0.0077i |

5. Codebook for unit 3-vector with 16 entries

| | | | |
|---|---|---|---|
| 1.0000 | 0.6488 | 0.6486 | 0.6477 |
| 0 | −0.2722 − 0.6005i | 0.0931 + 0.3515i | 0.3287 + 0.4950i |
| 0 | 0.0706 − 0.3734i | −0.2448 + 0.6223i | −0.4193 − 0.2274i |
| 0.6471 | 0.6466 | 0.6464 | 0.6459 |
| 0.2231 − 0.1846i | 0.1882 + 0.0336i | 0.0794 + 0.6194i | −0.6474 − 0.0518i |
| 0.6831 + 0.1755i | 0.1585 − 0.7213i | 0.4299 + 0.0856i | −0.1405 + 0.3759i |
| 0.6419 | 0.6284 | 0.6207 | 0.4294 |
| 0.1658 − 0.3921i | 0.7339 − 0.2025i | −0.5775 + 0.1865i | 0.1068 − 0.7487i |
| −0.6372 − 0.0277i | 0.0906 − 0.1318i | 0.3938 − 0.3023i | 0.1594 + 0.4672i |
| 0.2074 | 0.1865 | 0.1837 | 0.0374 |
| −0.3795 + 0.0080i | −0.4869 + 0.8293i | −0.4301 + 0.1769i | −0.0488 − 0.6311i |
| 0.6243 + 0.6505i | −0.2010 + 0.0085i | −0.3955 − 0.7704i | −0.3561 − 0.6864i |

6. Codebook for unit 3-vector with 32 entries

| | | | |
|---|---|---|---|
| 1.0000 | 0.7526 | 0.7509 | 0.7481 |
| 0 | −0.3439 − 0.0598i | 0.3036 − 0.1884i | −0.0646 − 0.4021i |
| 0 | −0.4612 + 0.3148i | 0.1404 − 0.5374i | 0.5170 − 0.0847i |
| 0.7452 | 0.7449 | 0.7439 | 0.7438 |
| 0.2966 + 0.2876i | 0.1001 + 0.2808i | 0.6040 − 0.2058i | −0.5992 − 0.1147i |
| −0.3700 + 0.3703i | 0.5965 + 0.0199i | 0.1521 + 0.1279i | 0.2120 + 0.1724i |
| 0.7436 | 0.7434 | 0.7425 | 0.7412 |
| −0.2467 + 0.5858i | 0.4184 + 0.4540i | 0.0402 + 0.1029i | 0.0482 − 0.3614i |
| −0.0021 + 0.2075i | −0.0535 − 0.2516i | −0.5397 − 0.3810i | 0.0199 + 0.5633i |
| 0.7395 | 0.7170 | 0.6983 | 0.4699 |
| −0.2918 + 0.2879i | −0.4693 − 0.2755i | 0.0587 − 0.6672i | 0.6648 − 0.2402i |
| 0.2295 − 0.4821i | −0.1499 − 0.4091i | −0.2478 − 0.0486i | −0.5151 + 0.1191i |
| 0.3996 | 0.3786 | 0.3600 | 0.3570 |
| −0.1100 + 0.4286i | −0.4105 + 0.4145i | −0.4324 − 0.1688i | 0.4915 − 0.2007i |
| 0.1781 + 0.7828i | −0.7176 − 0.0373i | 0.7806 + 0.2137i | 0.3794 + 0.6684i |
| 0.3527 | 0.3502 | 0.3464 | 0.3366 |
| −0.1710 − 0.1652i | −0.1031 − 0.4821i | 0.3551 + 0.2984i | 0.2923 − 0.6986i |
| 0.3188 − 0.8470i | −0.6503 − 0.4598i | −0.0099 − 0.8153i | 0.3858 − 0.4055i |
| 0.3362 | 0.3358 | 0.3305 | 0.3255 |
| −0.8816 − 0.0760i | 0.1212 − 0.0659i | −0.2162 − 0.8560i | 0.5691 + 0.7060i |
| −0.2927 + 0.1350i | −0.7672 + 0.5288i | 0.2964 + 0.1529i | −0.1068 + 0.2455i |
| 0.3192 | 0.3191 | 0.3172 | 0.2793 |
| −0.4631 − 0.4748i | 0.7029 + 0.3684i | −0.4168 + 0.7629i | −0.0442 + 0.6588i |
| −0.2546 + 0.6272i | 0.4362 − 0.2794i | 0.3153 − 0.2104i | −0.5048 − 0.4808i |

7. Codebook for unit 4-vector with 16 entries

| | | | |
|---|---|---|---|
| 1.0000 | 0.4472 | 0.4472 | 0.4472 |
| 0 | −0.1724 − 0.1948i | −0.3725 + 0.0174i | 0.0856 − 0.0165i |
| 0 | −0.5902 − 0.4842i | 0.6326 + 0.0053i | 0.4763 + 0.6014i |
| 0 | 0.2487 − 0.2962i | 0.3344 + 0.3860i | −0.2861 − 0.3493i |
| 0.4472 | 0.4472 | 0.4472 | 0.4472 |
| −0.4662 + 0.5039i | 0.4065 + 0.5827i | 0.0136 − 0.5519i | 0.4444 + 0.4741i |
| −0.1377 + 0.4998i | −0.3324 + 0.0505i | −0.0125 − 0.3136i | 0.2567 − 0.4724i |
| 0.1467 + 0.1959i | −0.1296 − 0.4068i | −0.1732 + 0.6056i | −0.1022 + 0.2797i |
| 0.4472 | 0.4472 | 0.4472 | 0.4472 |
| −0.5850 + 0.1479i | 0.2245 + 0.2110i | 0.2625 − 0.0166i | 0.2527 − 0.1676i |
| 0.0154 − 0.5690i | −0.2315 + 0.0149i | 0.3068 − 0.4663i | −0.6443 + 0.3722i |
| −0.3067 + 0.1335i | 0.8021 + 0.0893i | −0.1511 − 0.6296i | 0.0144 + 0.3927i |
| 0.4472 | 0.4472 | 0.4472 | 0.4472 |
| −0.0902 + 0.2314i | −0.6060 − 0.1391i | 0.5856 − 0.3342i | 0.0170 − 0.7479i |
| −0.1063 + 0.2369i | 0.1224 + 0.1502i | 0.4462 + 0.1617i | −0.2016 + 0.2127i |
| −0.7846 + 0.2351i | 0.3472 − 0.5052i | 0.3101 + 0.1548i | −0.2699 − 0.2856i |

8. Codebook for unit 4-vector with 32 entries

| | | | |
|---|---|---|---|
| 1.0000 | 0.5815 | 0.5803 | 0.5800 |
| 0 | 0.6728 − 0.0304i | −0.4396 − 0.1680i | 0.0638 − 0.0763i |
| 0 | 0.0912 + 0.1924i | 0.1470 + 0.4511i | 0.0043 + 0.1360i |
| 0 | 0.3753 − 0.1487i | −0.2554 + 0.3892i | 0.4924 + 0.6267i |
| 0.5790 | 0.5783 | 0.5778 | 0.5772 |
| −0.0798 − 0.5433i | −0.1493 + 0.3647i | −0.2381 + 0.2152i | 0.3920 − 0.0583i |
| −0.2099 + 0.4487i | 0.1651 + 0.5807i | −0.2892 − 0.6358i | 0.4369 − 0.4250i |
| 0.3190 − 0.1270i | 0.3702 − 0.0933i | −0.1431 − 0.2340i | −0.2533 − 0.2723i |
| 0.5767 | 0.5760 | 0.5752 | 0.5748 |
| 0.3278 + 0.3424i | 0.5150 + 0.1915i | 0.0243 + 0.0894i | 0.1239 − 0.4509i |
| 0.4700 + 0.2072i | −0.2886 − 0.4014i | −0.1112 − 0.0708i | −0.0535 − 0.5173i |
| −0.1927 + 0.3765i | −0.0449 + 0.3462i | −0.7920 + 0.1260i | 0.4243 − 0.0230i |
| 0.5741 | 0.5729 | 0.5727 | 0.5722 |
| −0.2444 − 0.3128i | −0.3048 + 0.6060i | −0.3564 − 0.5752i | −0.0925 − 0.0217i |
| −0.5885 − 0.1460i | −0.2151 − 0.0121i | 0.1201 − 0.1804i | 0.1175 − 0.0683i |
| −0.0992 + 0.3680i | −0.0406 + 0.4044i | −0.3161 − 0.2592i | 0.2986 − 0.7456i |
| 0.5720 | 0.5720 | 0.5717 | 0.5692 |

-continued

| | | | |
|---|---|---|---|
| 0.3645 − 0.2794i | −0.4313 + 0.3398i | −0.4555 + 0.1227i | 0.1887 − 0.1275i |
| −0.4879 − 0.0847i | 0.4964 − 0.0417i | −0.4262 + 0.3071i | 0.2389 + 0.5234i |
| −0.2309 − 0.4042i | −0.2752 − 0.2180i | −0.2232 − 0.3533i | −0.3608 − 0.4036i |
| 0.5669 | 0.5668 | 0.5665 | 0.5643 |
| −0.2179 − 0.0936i | 0.0474 + 0.4543i | 0.3106 + 0.6309i | −0.7006 − 0.0713i |
| 0.3185 − 0.4950i | 0.3247 − 0.3856i | −0.1126 + 0.0438i | 0.0211 − 0.1262i |
| −0.1483 + 0.5040i | 0.4647 + 0.0086i | −0.1877 − 0.3672i | 0.4102 + 0.0315i |
| 0.3897 | 0.0135 | 0.0090 | 0.0071 |
| 0.0131 − 0.3878i | 0.4962 − 0.0622i | 0.2624 + 0.0945i | 0.6845 − 0.6039i |
| 0.7419 + 0.2868i | −0.2856 − 0.2580i | −0.4780 + 0.5148i | −0.1757 − 0.3642i |
| 0.1920 + 0.1679i | 0.7742 − 0.0471i | 0.5886 + 0.2866i | −0.0097 − 0.0554i |
| 0.0069 | 0.0058 | 0.0046 | 0.0008 |
| 0.1546 + 0.7483i | 0.0390 − 0.4819i | −0.2420 + 0.3154i | 0.5456 + 0.2707i |
| −0.2194 + 0.0308i | −0.3259 − 0.3578i | −0.2618 + 0.5891i | 0.0699 + 0.0884i |
| −0.5637 + 0.2221i | 0.3831 + 0.6207i | −0.2427 + 0.6062i | 0.1840 − 0.7632i |

9. Codebook for unit 4-vector with 64 entries

| | | | |
|---|---|---|---|
| 1.0000 | 0.6899 | 0.6892 | 0.6884 |
| 0 | 0.2646 − 0.6236i | −0.4949 + 0.4988i | −0.3373 + 0.0843i |
| 0 | −0.1134 + 0.0228i | −0.1389 − 0.0687i | 0.0189 − 0.3053i |
| 0 | −0.0291 + 0.2257i | 0.0640 − 0.0561i | −0.5428 − 0.1305i |
| 0.6882 | 0.6873 | 0.6867 | 0.6867 |
| 0.4005 − 0.1592i | 0.0675 + 0.2053i | −0.0025 + 0.2047i | 0.1403 − 0.3819i |
| 0.0492 − 0.1322i | −0.3177 − 0.4477i | 0.4546 + 0.2540i | 0.0575 + 0.5078i |
| 0.5584 + 0.0944i | 0.2144 − 0.3654i | −0.4570 − 0.0803i | −0.0735 − 0.3103i |
| 0.6865 | 0.6835 | 0.6834 | 0.6815 |
| −0.1019 − 0.1807i | 0.4833 + 0.2398i | 0.0489 + 0.4950i | −0.0967 + 0.0900i |
| 0.1758 − 0.2421i | −0.0778 − 0.2194i | 0.3846 + 0.2144i | −0.3679 + 0.4953i |
| 0.1078 + 0.6202i | −0.4325 − 0.0217i | 0.2971 + 0.0584i | 0.2643 + 0.2599i |
| 0.6812 | 0.6811 | 0.6801 | 0.6798 |
| 0.2106 − 0.0503i | −0.0850 − 0.0071i | 0.4167 + 0.4068i | −0.3638 − 0.2822i |
| −0.0361 + 0.4444i | 0.4651 + 0.0155i | −0.2684 + 0.2810i | −0.4686 − 0.2498i |
| −0.3578 + 0.4028i | 0.1476 − 0.5390i | 0.1064 − 0.1897i | 0.2001 + 0.0626i |
| 0.6779 | 0.6776 | 0.6691 | 0.6674 |
| −0.4620 − 0.2641i | −0.3111 + 0.0354i | 0.1055 + 0.4814i | −0.1586 − 0.4905i |
| 0.2995 + 0.2884i | −0.2317 + 0.1869i | −0.1206 − 0.0501i | 0.3874 − 0.3680i |
| 0.2473 + 0.1525i | −0.0726 − 0.5907i | −0.0295 + 0.5398i | −0.0082 − 0.0569i |
| 0.6219 | 0.6158 | 0.6110 | 0.6067 |
| 0.0306 − 0.2794i | 0.5008 − 0.3037i | 0.1066 + 0.2804i | −0.5547 + 0.0351i |
| −0.5549 − 0.1114i | 0.1027 − 0.1870i | 0.4186 − 0.5915i | −0.0738 + 0.4088i |
| −0.4610 − 0.0382i | −0.0817 − 0.4749i | −0.0353 + 0.1017i | −0.3616 + 0.1404i |
| 0.6024 | 0.5944 | 0.5670 | 0.4713 |
| −0.2557 + 0.1666i | 0.3618 − 0.0342i | 0.6426 − 0.0416i | −0.2584 − 0.5426i |
| −0.0702 + 0.0171i | −0.5930 − 0.2736i | 0.4669 + 0.1481i | 0.1850 + 0.0064i |
| 0.7304 − 0.0725i | 0.1523 + 0.2549i | −0.0506 + 0.1462i | −0.5943 + 0.1709i |
| 0.4671 | 0.4434 | 0.4130 | 0.4033 |
| 0.1507 − 0.3379i | −0.3875 + 0.2337i | −0.0986 − 0.4272i | 0.1335 − 0.1322i |
| 0.0319 − 0.6058i | −0.2220 − 0.6510i | −0.1590 + 0.4303i | 0.6346 + 0.3346i |
| −0.4595 + 0.2564i | −0.0071 + 0.3543i | 0.6257 − 0.1879i | 0.4870 + 0.2240i |
| 0.3917 | 0.3819 | 0.3741 | 0.3623 |
| −0.6602 − 0.5622i | −0.3886 + 0.4925i | 0.1750 − 0.5460i | 0.3505 + 0.3552i |
| −0.0387 − 0.0060i | 0.3083 − 0.3061i | −0.5397 − 0.0018i | 0.2157 + 0.2191i |
| 0.0738 − 0.2961i | 0.3959 + 0.3392i | 0.1165 − 0.4759i | −0.2216 − 0.6900i |
| 0.3581 | 0.3581 | 0.3571 | 0.3413 |
| −0.2724 + 0.5525i | −0.3470 + 0.6183i | −0.5480 + 0.2149i | 0.0131 + 0.6704i |
| −0.1459 + 0.6570i | 0.4409 + 0.0466i | 0.3061 − 0.5573i | −0.1876 + 0.1707i |
| −0.0374 − 0.1947i | −0.1185 − 0.3980i | 0.0936 − 0.3360i | −0.6079 + 0.0024i |
| 0.3392 | 0.3385 | 0.3379 | 0.3343 |
| 0.0093 + 0.3250i | −0.2840 + 0.1067i | 0.1396 + 0.3295i | −0.0767 − 0.3157i |
| −0.8233 + 0.2046i | −0.0565 + 0.3029i | 0.5730 + 0.0330i | 0.7591 + 0.2427i |
| −0.2318 − 0.0761i | 0.0812 + 0.8317i | 0.0396 + 0.6533i | −0.2271 + 0.3099i |
| 0.3173 | 0.3109 | 0.2932 | 0.2850 |
| 0.7447 + 0.5251i | −0.2910 − 0.3256i | 0.6426 − 0.2371i | 0.7010 − 0.2362i |
| 0.0619 − 0.1883i | 0.0600 − 0.5515i | −0.5571 + 0.2499i | −0.0449 + 0.4844i |
| 0.1607 + 0.0627i | 0.6321 − 0.0733i | −0.2523 − 0.0921i | 0.3288 + 0.1636i |
| 0.2803 | 0.2718 | 0.2692 | 0.2611 |
| 0.2262 − 0.4122i | −0.1135 − 0.3920i | 0.2484 + 0.3635i | −0.6202 + 0.0302i |
| 0.0557 − 0.7946i | 0.0387 − 0.2933i | 0.3151 − 0.5331i | 0.5699 + 0.0380i |
| 0.1077 − 0.2328i | 0.1071 − 0.8128i | 0.1524 − 0.5718i | −0.4642 − 0.0676i |
| 0.2601 | 0.2550 | 0.2543 | 0.2491 |
| 0.5093 − 0.4079i | 0.1973 − 0.0627i | 0.3491 − 0.0428i | 0.4927 + 0.2139i |
| −0.0508 − 0.5008i | −0.3691 + 0.2462i | 0.5519 + 0.5917i | −0.2198 + 0.1684i |
| 0.2102 + 0.4571i | −0.6112 − 0.5672i | 0.1156 − 0.3788i | 0.7212 − 0.2293i |
| 0.2468 | 0.2440 | 0.2299 | 0.2133 |
| −0.0489 + 0.0375i | −0.6799 − 0.4190i | 0.0532 + 0.1712i | −0.6352 + 0.3807i |
| −0.7189 + 0.1380i | −0.3260 + 0.1995i | 0.1764 − 0.2053i | −0.4685 + 0.0174i |
| 0.5304 − 0.3436i | 0.0631 + 0.3906i | −0.7566 + 0.5189i | −0.2440 + 0.3560i |
| 0.1948 | 0.1916 | 0.1558 | 0.0304 |
| −0.3185 − 0.1529i | 0.1084 + 0.1450i | 0.1261 − 0.5681i | −0.5753 − 0.6342i |

| -continued | | | |
|---|---|---|---|
| −0.0069 + 0.9135i | −0.6424 − 0.2670i | −0.0431 + 0.2171i | 0.2372 − 0.3286i |
| 0.0505 − 0.0090i | −0.4735 + 0.4716i | 0.0910 + 0.7615i | 0.0895 + 0.3060i |

What is claimed is:

1. A method performed by a wireless station in a closed loop multiple-input-multiple-output (MIMO) wireless network, the method comprising:
   quantizing a column of a beamforming matrix using a codebook;
   performing a Householder reflection on the beamforming matrix to reduce the dimensionality of the beamforming matrix;
   recursively repeating the quantizing and performing of Householder reflection on the previously dimensionality-reduced beamforming matrix in order to obtain a further reduction of dimensionality of the beamforming matrix;
   performing the preceding actions for each carrier of a subset of OFDM carriers to obtain quantized column vectors for the subset of OFDM carriers; and
   transmitting the quantized column vectors for the subset of OFDM carriers.

2. The method of claim 1 wherein recursively repeating the quantizing results in a plurality of quantized column vectors, and each of the plurality of quantized column vectors is quantized using a different codebook.

3. The method of claim 2 wherein a size of the codebook for each recursion is smaller than a size of a codebook for a previous recursion.

4. The method of claim 1 wherein the beamforming matrix comprises three columns, and recursively repeating the quantizing comprises quantizing a first column using six bits, a second column using five bits, and a third column using four bits.

5. The method of claim 1 wherein the beamforming matrix comprises three columns, and recursively repeating the quantizing comprises quantizing a first column using five bits, a second column using four bits, and a third column using three bits.

6. The method of claim 1 further comprising:
   quantizing a small matrix using a codebook having entries that represent small matrices.

7. The method of claim 1 wherein performing a Householder reflection on the beamforming matrix comprises performing the Householder reflection as a function of the column vector.

8. The method of claim 1 wherein performing a Householder reflection on the beamforming matrix comprises performing the Householder reflection as a function of a column vector selected from a codebook.

9. A computer-readable medium having instructions stored thereon that when accessed result in a wireless station in a closed loop multiple-input-multiple-output (MIMO) wireless network performing:
   quantizing a column of a beamforming matrix using a codebook;
   performing a Householder reflection on the beamforming matrix to reduce the dimensionality of the beamforming matrix;
   recursively repeating the quantizing and performing of Householder reflection on the previously dimensionality-reduced beamforming matrix in order to obtain a further reduction of dimensionality of the beamforming matrix;
   performing the preceding actions for each carrier of a subset of OFDM carriers to obtain quantized column vectors for the subset of OFDM carriers; and
   transmitting the quantized column vectors for the subset of OFDM carriers.

10. The article of claim 9 wherein recursively repeating the quantizing results in a plurality of quantized column vectors, and each of the plurality of quantized column vectors is quantized using a different codebook.

11. The article of claim 10 wherein a size of the codebook for each recursion is smaller than a size of a codebook for a previous recursion.

12. The article of claim 9 wherein the beamforming matrix comprises three columns, and recursively repeating the quantizing comprises quantizing a first column using six bits, a second column using five bits, and a third column using four bits.

* * * * *